United States Patent
Sangeet (10) Patent No.: US 9,959,778 B2
(45) Date of Patent: May 1, 2018

(54) SYSTEM AND METHOD FOR FACILITATING LEARNING OF A MUSICAL INSTRUMENT

(75) Inventor: Bedi Sangeet, Hillcrest Villa (SG)

(73) Assignee: SAMANA HOLDINGS PTE. LTD., Hillcrest Villa (SG)

( * ) Notice: Subject to any disclaimer, the term of this patent is extended or adjusted under 35 U.S.C. 154(b) by 223 days.

(21) Appl. No.: 14/396,960

(22) PCT Filed: Apr. 24, 2012

(86) PCT No.: PCT/SG2012/000145
§ 371 (c)(1),
(2), (4) Date: Mar. 6, 2015

(87) PCT Pub. No.: WO2013/162462
PCT Pub. Date: Oct. 31, 2013

(65) Prior Publication Data
US 2015/0339944 A1    Nov. 26, 2015

(51) Int. Cl.
*G09B 15/02* (2006.01)
*G09B 15/00* (2006.01)
*G09B 15/04* (2006.01)

(52) U.S. Cl.
CPC ......... *G09B 15/002* (2013.01); *G09B 15/003* (2013.01); *G09B 15/04* (2013.01)

(58) Field of Classification Search
CPC ..... G09B 15/002; G09B 15/003; G09B 15/04
USPC ....................................... 84/470 R
See application file for complete search history.

(56) References Cited

U.S. PATENT DOCUMENTS

| | | | |
|---|---|---|---|
| 2009/0019990 A1* | 1/2009 | Chien | G09B 15/08 84/478 |
| 2010/0162878 A1 | 7/2010 | Lengeling et al. | |
| 2010/0307319 A1* | 12/2010 | Kani | G10G 1/02 84/485 R |
| 2012/0042766 A1 | 2/2012 | Spata | |
| 2016/0253915 A1* | 9/2016 | Lee | G09B 15/00 |

OTHER PUBLICATIONS

International Search Report dated May 10, 2012, dated May 16, 2012.
Great Britain Examination Report for corresponding Great Britian Application No. GB 1420671.8 dated Apr. 1, 2016.

* cited by examiner

*Primary Examiner* — Jianchun Qin
(74) *Attorney, Agent, or Firm* — Norris McLaughlin & Marcus P.A.

(57) ABSTRACT

Systems and methods facilitate a user's learning to play a musical piece on a musical instrument and involve dividing a musical piece into a number of musical piece segments. The systems and methods display or cause display of a particular segment of the musical piece. A suggested playing position is displayed adjacent to each musical note in a textual representation. Each of the displayed musical notes in the textual representation aims to indicate to the user the pitch or key of a particular musical note to be played. The suggested playing position for each musical note in turn aims to indicate the fingering position for placement on a musical instrument for playing the musical note.

23 Claims, 7 Drawing Sheets

Chorus

| 4 | 4 | 3 | 2 | 3 |   | 3 | 3 | 3 | 3 | 3 | 4 | 1 | 2 |
|---|---|---|---|---|---|---|---|---|---|---|---|---|---|
| A | A | G | F | G |   | G | G | G | G | G | A | E | F |
| Aa | De- | Khen | Za- | Ra |   | Ki- | s- | me | Ki- | t- | na- | Hai- | dum |

|   |   |   |   |   |   |   | C | A |   |   | Dm |
|---|---|---|---|---|---|---|---|---|---|---|---|
| 4 | 4 | 4 | 4 | 5 | 4 | 4 | 1 | 4 | 4 | 2 | 4 | 5 |
| C' | C' | C' | C' | D' | C' | C' | G | C#' | C#' | A | C#' | D' |
| Jum | Ke | Ra- | kh- | na- | Ka | Da- | m |   | Me- | re | Saa- | thi- | ya |

FIG 3a

Verse

| 3 | 4 | 2 | 3 | 4 | 2 | 3 | 3 |
|---|---|---|---|---|---|---|---|
| D' | E' | C#' | D' | E' | C#' | D' | D' |
| Aa | ge- | Ni | Kal | Aa- | Ye | Hu- | - M |

← 21
← 22
← 23

| Gm |   |   |   | Dm |
|---|---|---|---|---|
| 2 | 2 | 3 | 3 | 3 | 4 |
| Bb | Bb | C#' | C#' | C#' | D' |
| Pi- | chche | Re- | He | Ga- | Ye |

FIG 3b

Verse

|   |   |   |   |   |   |   |   | A |
|---|---|---|---|---|---|---|---|---|
| 3 | 4 | 2 | 3 | 4 | 2 | 3 | 3 | 4 |
| D' | E' | C#' | D' | E' | C#' | D' | D' | E' |
| U- | pper- | Cha- | Le | Aa- | Ye | Hu- | - | m |

| Gm |   |   |   | Dm |
|---|---|---|---|---|
| 2 | 2 | 3 | 3 | 3 | 4 |
| Bb | Bb | C#' | C#' | C#' | D' |
| Ni- | chche | Re- | He | Ga- | ye |

FIG 3c

Verse

| 3 | 1 | 3 | 1 | 3 | 5 |   | 4 | 3 | 4 | 5 | 4 | 3 | 1 |
|---|---|---|---|---|---|---|---|---|---|---|---|---|---|
| F | C | F | C | F | A |   | G | F | G | A | G | F | D |
| You | Can | Ne- | ver | Stop | us |   | Ne- | ver | break | Us | Do- | w- | n |

| 1 | 2 | 2 | 5 | 1 | 1 | 3 |   | 3 | 2 | 4 | 4 | 2 | 5 |
|---|---|---|---|---|---|---|---|---|---|---|---|---|---|
| D | F | F | C' | F | F | A |   | Bb | A | C' | C' | A | D' |
| Cos | I | Have | You | Be- | sides | Me |   | Be- | tter | Not | Mess | A- | round |

| Chorus | | | | | | | | | | | | |
|---|---|---|---|---|---|---|---|---|---|---|---|---|
| F | | | | C | | | | | | | | F |
| 4 | 4 | 3 | 2 | 3 | | 3 | 3 | 3 | 3 | 3 | 4 | 1 | 2 |
| A | A | G | F | G | | G | G | G | G | G | A | E | F |
| Aa | De- | Khen | Za- | Ra | | Ki- | s- | me | Ki- | t- | na- | Hai- | dum |
| | | | | | | | | C | | A | | | Dm |
| 4 | 4 | 4 | 4 | 5 | 4 | 4 | 1 | | 4 | 4 | 2 | 4 | 5 |
| C' | C' | C' | C' | D' | C' | C' | G | | C#' | C#' | A | C#' | D' |
| Jum | Ke | Ra- | kh- | na- | Ka | Da- | m | | Me- | re | Saa- | thi- | ya |

| Verse | ←26 | | | | | | ←27 | |
|---|---|---|---|---|---|---|---|---|
| Dm | | | | | | | A | |
| 3 | 4 | 2 | 3 | 4 | 2 | 3 | 3 | 4 |
| D' | E' | C#' | D' | E' | C#' | D' | D' | E' |
| Aa | ge- | Ni | Kal | Aa- | Ye | Hu- | - | M |
| Gm ←28 | | | | Dm ←29 | | | | |
| 2 | 2 | 3 | 3 | 3 | 4 | | | |
| Bb | Bb | C#' | C#' | C#' | D' | | | |
| Pi- | chche | Re- | He | Ga- | Ye | | | |

| Dm | | | | | | | A | |
|---|---|---|---|---|---|---|---|---|
| 3 | 4 | 2 | 3 | 4 | 2 | 3 | 3 | 4 |
| D' | E' | C#' | D' | E' | C#' | D' | D' | E' |
| U- | pper- | Cha- | Le | Aa- | Ye | Hu- | - | m |
| Gm | | | | Dm | | | | |
| 2 | 2 | 3 | 3 | 3 | 4 | | | |
| Bb | Bb | C#' | C#' | C#' | D' | | | |
| Ni- | chche | Re- | He | Ga- | ye | | | |

| Verse | | | | | | | | | | | |
|---|---|---|---|---|---|---|---|---|---|---|---|
| F | | | | | | | | | | | |
| 3 | 1 | 3 | 1 | 3 | 5 | 4 | 3 | 4 | 5 | 4 | 3 | 1 |
| F | C | F | C | F | A | G | F | G | A | G | F | D |
| You | Can | Ne- | ver | Stop | us | Ne- | ver | break | Us | Do- | w- | n |
| | F | | | | | | | | | | | Dm |
| 1 | 2 | 2 | 5 | 1 | 1 | 3 | 3 | 2 | 4 | 4 | 2 | 5 |
| D | F | F | C' | F | F | A | Bb | A | C' | C' | A | D' |
| Cos | I | Have | You | Be- | sides | Me | Be- | tter | Not | Mess | A- | round |

SYSTEM AND METHOD FOR FACILITATING LEARNING OF A MUSICAL INSTRUMENT

This application is a 371 application of PCT/SG2012/000145 filed Apr. 24, 2012, the disclosure of which is incorporated herein by reference.

FIELD OF THE INVENTION

The present invention relates generally to a system and a method for facilitating learning to play a musical instrument, and, in particular, learning to play a musical piece on the musical instrument.

BACKGROUND OF THE INVENTION

Most existing methods for learning to play a musical instrument are music theory orientated, meaning that the fundamentals of the theory of music are learnt before one learns to play a musical piece on the musical instrument. Learning the fundamentals of the theory of music may involve learning how to read traditional music scores, which set out the musical notes to be played. In these traditional learning methods, understanding how various musical notations carry different information on their respective pitch, timing and duration is essential for a music learner to be able to play a musical piece.

Those who wish to learn to play a particular song or songs may however find it time consuming and be discouraged by the need to first learn the rules of reading traditional music scores. Furthermore, even after learning the rules of how to read traditional music scores once, some may find it difficult to recall the various rules after an extended period of time without frequent or regular practicing.

SUMMARY OF THE INVENTION

According to a first aspect of the invention, there is provided a method for facilitating learning of a musical piece to be played on a musical instrument, the musical piece including a plurality of musical piece segments, the method comprises the steps of:
for each one of the plurality of musical piece segments,
causing display of a playing position adjacent to a textual representation of a musical note of the respective musical piece segment and/or adjacent to lyrics of the respective musical piece segment; and
providing one or more tempo-adjusted audio representations of the respective musical piece segment.

Preferably the step of providing one or more tempo-adjusted audio representations of the respective musical piece segment includes the step of providing two or more audio representations of the respective musical piece segment at different tempos. More preferably the step of providing the two or more audio representations of the respective musical piece segment at different tempos includes the step of providing the two or more audio representations of the respective musical piece segment sequentially at progressively faster tempos.

Preferably the step of causing display of a playing position includes the step of causing display of a fingering position for placement of a finger on the musical instrument. More preferably the step of causing display of a fingering position includes the step of causing display of a numeric representation of the fingering position. Even more preferably the step of causing display of a numeric representation of the fingering position includes the step of causing display of any one of 1, 2, 3, 4 and 5 to represent a musical note to be played, respectively, by a thumb, an index finger, a middle finger, a ring finger and a little finger.

Alternatively the step of causing display of a fingering position includes the step of causing display of a graphical or animated representation of the fingering position on the musical instrument. More preferably the step of causing display of a graphical or animated representation of the fingering position on the musical instrument includes the step of causing display of guitar tablature.

Preferably the method further comprises the step of recording or causing recording of an audio or video representation of at least a part of the musical piece performed by a user of the method. More preferably the method further comprises the step of receiving the recorded representation for any one of more of storage, downloading and streaming. Even more preferably, the step of receiving the recorded representation includes the step of limiting availability for receiving the recorded presentation to a first predetermined set of users. Still more preferably, the step of receiving the recorded representation for downloading or streaming includes the step of limiting availability for the downloading or the streaming to a second predetermined set of users.

Preferably the method further comprises the step of providing an audio representation of the musical piece. More preferably the step of providing an audio representation of a musical piece precedes the step of causing display of a playing position or the step of providing one or more tempo-adjusted audio representations.

Preferably the step of providing an audio representation of a musical piece includes the step of providing an audio representation of the musical piece played by the musical instrument. Alternatively, the step of providing an audio representation of the musical piece includes the step of providing an audio representation of the musical piece played by a digitised form of the musical instrument.

Preferably the textual representation of the musical note includes musical notations. More preferably the musical notations include any one or more of A, B, C, D, E, F, G, $A^\#$, $B^\#$, $C^\#$, $D^\#$, $E^\#$, $F^\#$, $G^\#$, $A^b$, $B^b$, $C^b$, $D^b$, $E^b$, $F^b$ and $G^b$. Alternatively, the musical notations include any one or more of do (or d), re (or r), mi (or m), fa (or f), so (or s), la (or l) and ti (or t).

Preferably the musical piece is a lyrical musical piece and the tempo-adjusted audio representations of the respective musical piece segment include backing music without the lyrics.

In one embodiment, the plurality of musical piece segments include four musical piece segments.

According to a second aspect of the invention, there is provided a computer system for facilitating learning of a musical piece to be played on a musical instrument, the musical piece including a plurality of musical piece segments, the computer system comprising a processor being configured to execute the steps of:
for each one of the plurality of musical piece segments,
causing display of a playing position adjacent to a textual representation of a musical note of the respective musical piece segment and/or lyrics of the respective musical piece segment; and
providing one or more tempo-adjusted audio representations of the respective musical piece segment.

According to a third aspect of the invention, there is provided an apparatus for facilitating learning of a musical piece to be played on a musical instrument, the musical piece including a plurality of musical piece segments, the apparatus comprises:

an audio device for playing one or more tempo-adjusted audio representations of each of the plurality of the musical piece segments; and display means for displaying, for each of the musical piece segments, a playing position adjacent to a textual representation of a musical note of the respective musical piece segment and/or lyrics of the respective musical piece segment.

According to a fourth aspect of the invention, there is provided a computer or processor readable medium for facilitating learning of a musical piece to be played on a musical instrument, the musical piece including a plurality of musical piece segments, the computer or processor readable medium comprising instructions to cause a computer or processor to execute the steps of:

for each one of the plurality of musical piece segments,
causing display of a playing position adjacent to a textual representation of a musical note of the respective musical piece segment and/or lyrics of the respective musical piece segment; and
providing one or more tempo-adjusted audio representations of the respective musical piece segment.

BRIEF DESCRIPTION OF THE ACCOMPANYING DRAWINGS

The following detailed description of preferred embodiment(s) of the invention will be better understood when read in conjunction with the appended drawings. The present invention is illustrated by way of example and is not limited by the accompanying figures.

DETAILED DESCRIPTION OF THE PREFERRED EMBODIMENT(S)

The present invention relates to a system and a method for facilitating a user's learning to play a musical piece on a musical instrument, such as a piano. Targeted users of the learning method and system are music learners who wish to learn a particular piece or pieces of music to be played on the musical instrument. The learning method and system according to the present invention is designed to help music learners, including those without prior knowledge of reading traditional music scores with graphical music notations (see FIG. 1), to play or perform a particular musical piece or pieces. A desirable outcome of the present invention in its preferred embodiment is to create an immediate sense of satisfaction for music learners from performing musical pieces, such as piano songs, thereby encouraging and motivating further learning.

Figure 1:
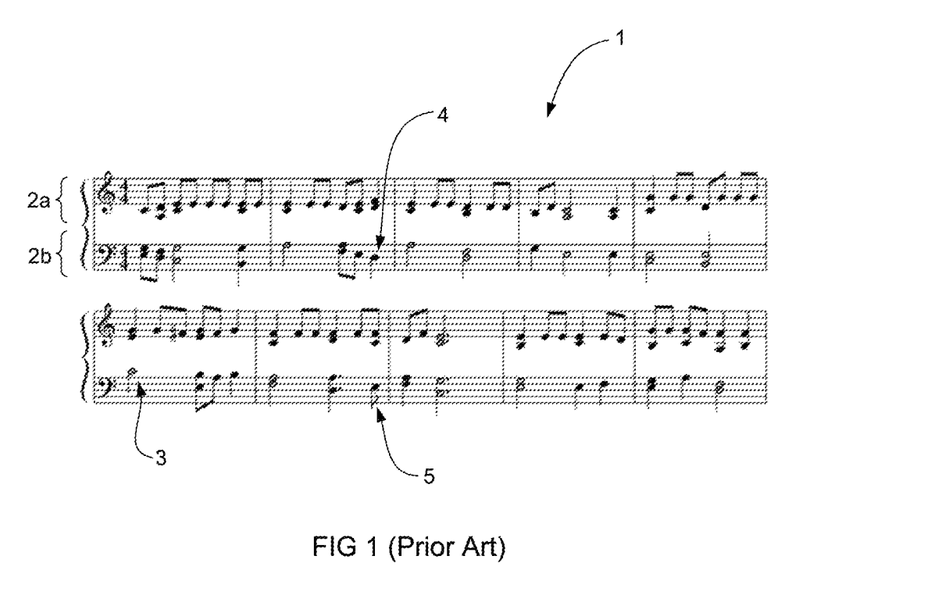
FIG. 1 is an example of a music score with graphical musical notations.

FIG. 1 illustrates the complexity of traditional music scores. FIG. 1 shows an example of a music score for piano with graphical musical notations. In this example, the music score 1 consists of two staffs 2a and 2b, generally representing the musical notes to be played by the left and right hands, respectively. Each staff in turn consists of 5 horizontal lines on which musical notes in graphical music notations (such as 3, 4 and 5) are written. Each of the graphical music notations represents the pitch, timing and duration of the respective musical note. For example, graphical music notation 3 is a minim denoting the musical note $C_4$, or commonly known as middle C, at 261.626 Hz (pitch) lasting for two beats (duration) at the start of the sixth bar (timing). Graphical music notation 4 is a crotchet denoting the musical note $D_3$ (pitch) lasting for one beat (duration) at the end of the second bar (timing). Graphical music notation 5 is a quaver denoting the musical note $E_3$ (pitch) lasting for half a beat (duration) at the end of the seventh bar (timing). The above example illustrates a small set of rules among a much larger set of rules that a music learner learns before being able to play a musical piece represented in such a traditional music score.

In contrast, the present invention does not require a music learner to learn these rules before being able to play a musical piece. In a preferred embodiment, the present invention is an independent music learning system and method that may be implemented without the presence of a music teacher. The present invention may be provided in an online and conventional teaching environment. For example, the present invention may be provided via an Internet website, self-help books, CDs, DVDs or other computer or processor readable medium, or at a physical music school with the appropriate independent music learning system. If provided in an online environment, the present invention may be implemented via a music learning Internet website. The learning method may be delivered to a user of the method as an online lesson, with the user's system, such as a computer system, being configured to execute the learning method. If the present invention is provided at a music school, an appropriate learning apparatus comprising an audio device and display means may be provided to carry out the learning method as detailed below. Furthermore, the present invention may be provided to a music learner by, for example, purchasing a computer or processor readable medium such as a CD or DVD, which contains instructions for a computer or processor to execute the learning method.

Figure 2:
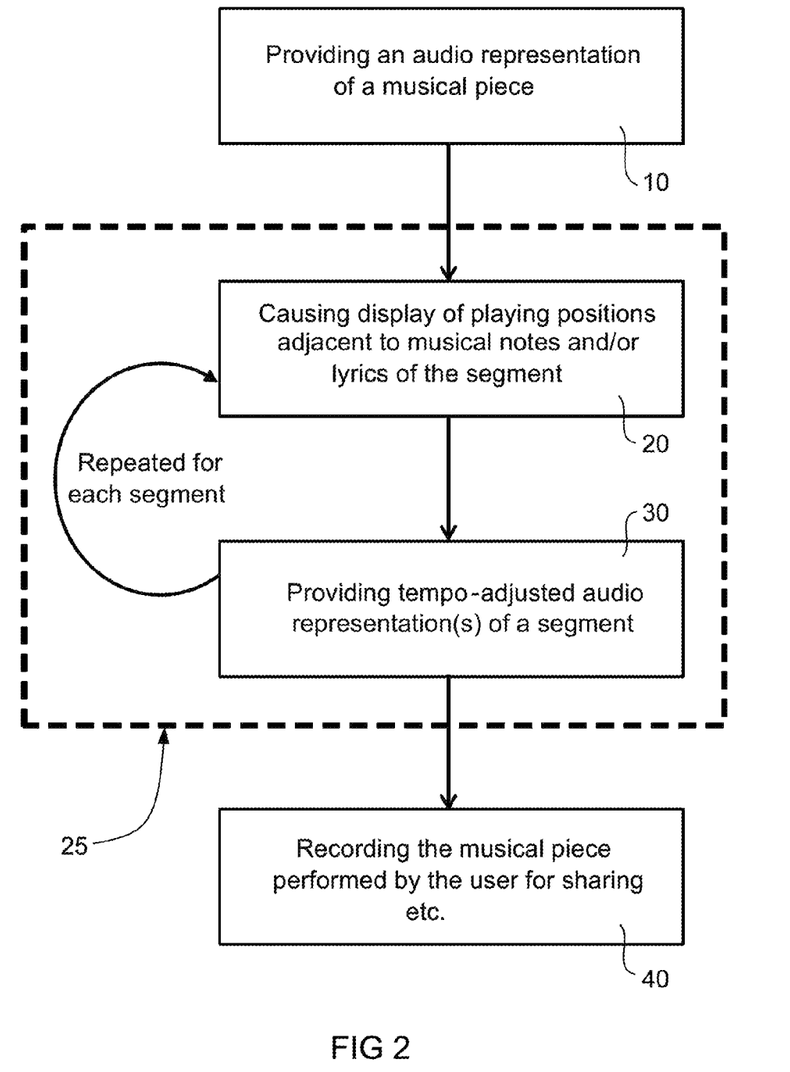
FIG. 2 is flowchart illustrating the steps of the learning method according to one embodiment of the present invention.

FIG. 2 illustrates an embodiment of the method for facilitating learning of a musical piece to be played on a musical instrument according to the present invention. The musical piece may be divided into a number of musical piece segments. In this embodiment, the learning method may start at step 10 by providing to a user an audio representation of the entire musical piece. Providing an audio representation may involve playing or causing playing of the audio representation via an audio device, such as a loud speaker. The provided audio representation may have the effect of providing a music learner with an overview of how the musical piece should sound or be played in general. The audio representation of the musical piece aims to indicate to the music learner the timing and duration of each musical note to be played. In other words, by listening to the musical piece provided by the learning method, the user may learn the timing and duration of each musical note without the need to understand the fundamentals of music theory or to know how to read traditional music scores. For musical pieces such as a song with lyrics, step 10 may have the additional benefit of familiarising the music learner with the rhythm and tune linked to the lyrics of the song. Repeated listening therefore allows the music learner to recognise or memorise the intended duration and pitch of each musical note. While step 10 is a desirable step of the learning method in a preferred embodiment, step 10 may be replaced by step 30 (described below) which provides the same or similar desirable effects as step 10.

Figure 3A:
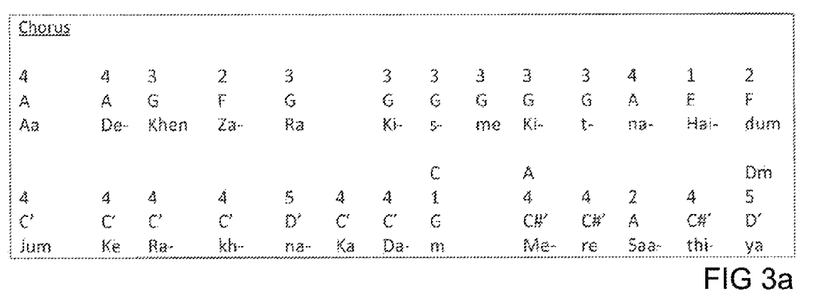
FIGS. 3A to 3D are screenshots of a display to the user of the learning method at step 30 according to one embodiment of the present invention.

At step 20, the learning method displays or causes display of a particular segment of the musical piece. FIG. 3A illustrates an example of the display of the first segment of the song titled "Bekrar Karke". A suggested playing position 21 may be displayed adjacent to each musical note 22 in a textual representation. Each of the displayed musical notes in the textual representation aims to indicate to the user the pitch or key of a particular musical note to be played. The suggested playing position (such as 21) for each musical note (such as 22) in turn aims to indicate the fingering position for placement on a musical instrument for playing the musical note. For instance, the suggested playing position 21 may indicate that the user is suggested to use his/her index finger for hitting a piano key $G^b$.

Figure 3B:
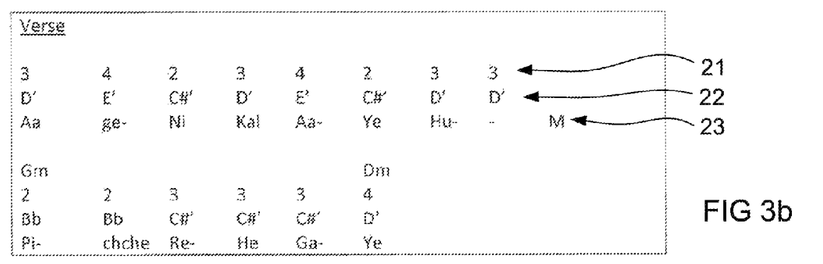
Figure 3C:
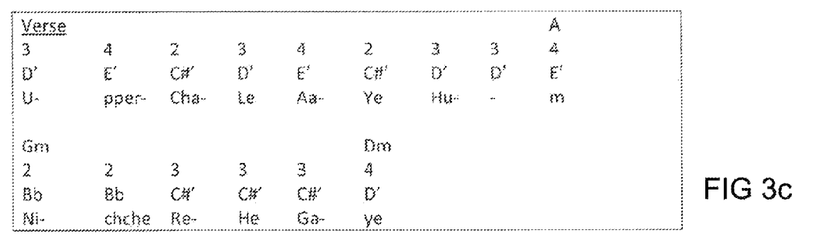
Figure 3D:
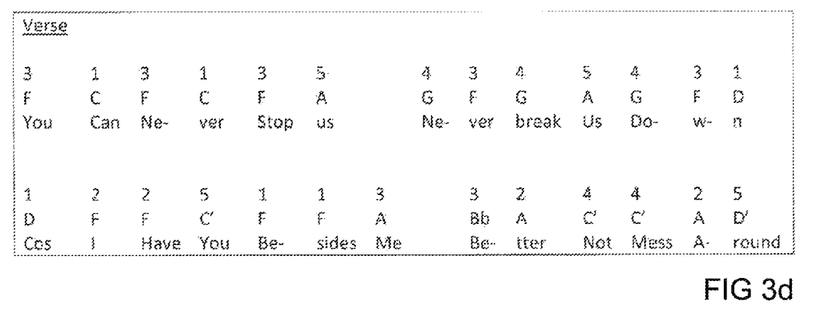
Figure 6:
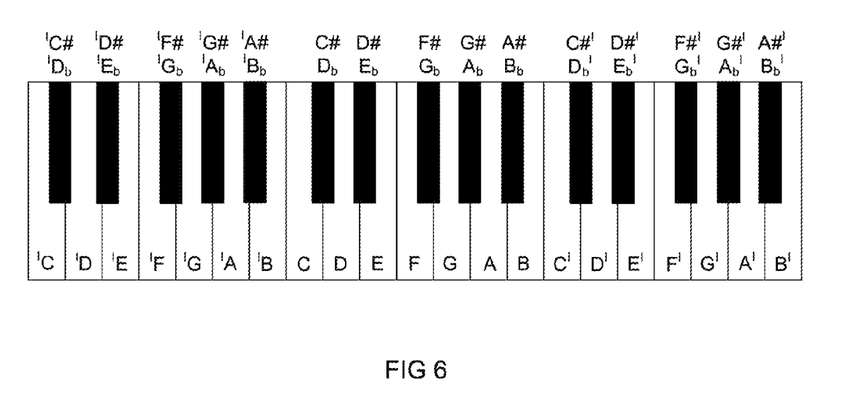
FIG. 6 illustrates a virtual keyboard.

As illustrated in this example, instead of being displayed in graphical music notations such as crotchets, minims or quavers on a music score, the musical notes may each be displayed in a textual representation of the musical notes. The textual representation shown in FIG. 3A represents musical notes in a twelve-note octave, with the twelve notes being displayed as C or $B^\#$, $C^\#$ or $D^b$, D, $D^\#$ or $E^b$, E or $F^b$, $E^\#$ or F, $F^\#$ or $G^b$, G, $G^\#$ or $A^b$, A, $A^\#$ or $B^b$ and B or $C^b$. Alternatively, the musical notes may be displayed in textual form do, re, mi, fa, so, la, and ti (or simply d, r, e, f, s, l and t), representing musical notes in an octave of a scale. Different countries may have a similar but different convention to represent musical notes in an octave of a scale. For example, in India, the textual form sa, re, ga, ma, pa, da, and ni may be used instead of do, re, mi, fa, so, la, and ti. The display of musical notes may be accompanied by a display of a virtual instrument, such as a virtual keyboard illustrated in FIG. 6, such that the user may be able to recognise, for example, the key to hit for the textual representation of a particular musical note. For musical pieces with lyrics such as songs, the learning method may alternatively, or additionally, display the suggested playing positions 21 adjacent to the corresponding lyrics 23, with or without the textual representation of the musical notes 22. As illustrated in FIG. 3B, the first three musical notes D', E' and $C^{\#\prime}$ are displayed adjacent to not only the fingering positions 3, 4 and 2, respectively, but also adjacent to the corresponding lyrics "Aa", "ge" and "Ni", which are the corresponding three syllables to the first three musical notes. To denote the octave in which a musical note is in, a prime sign (') or signs may be used before or after the textual representation of a musical note. For example, C' denotes the musical note C one octave above middle C, whereas 'C denotes the musical note C one octave below middle C. Also as illustrated in this example, the fingering position for each musical note to be played may be represented by a numeric representation of the fingering position. For instance, as illustrated in FIG. 3A, the fingering positions are displayed as 1, 2, 3, 4 or 5 above the textual representation of the musical notes. These numeric representations may represent musical notes to be played, respectively, by a thumb, an index finger, a middle finger, a ring finger and a little finger.

Figure 4A:
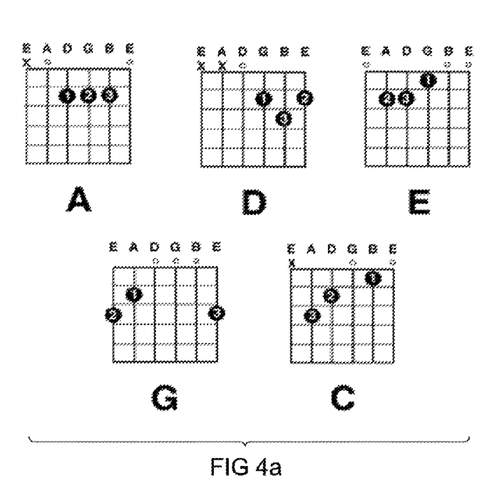
FIGS. 4a to 4c illustrate examples of guitar tablature as a form of fingering position in graphical representation.
Figure 4B:
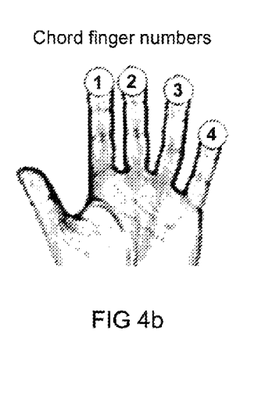
Figure 4C:
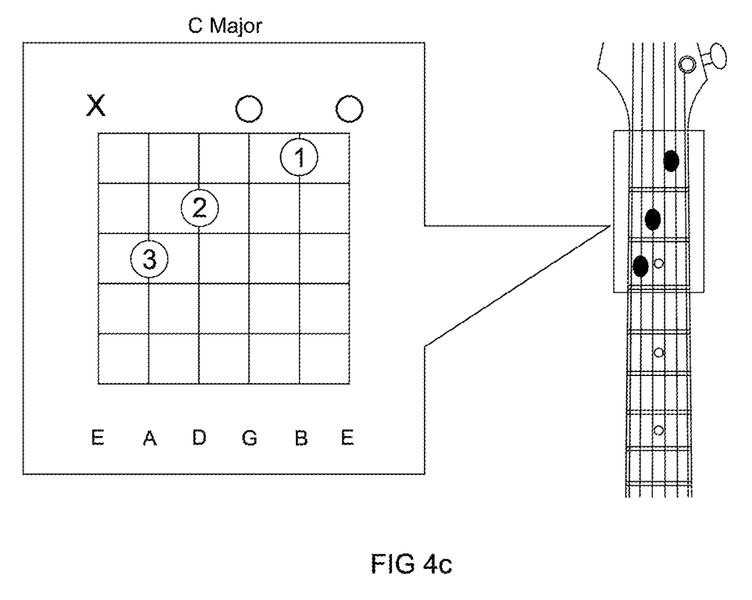

In another embodiment, the suggested fingering positions on the musical instrument may be displayed as a graphical representation (e.g. a virtual keyboard or a picture of a particular finger hitting a piano key) or an animated representation (e.g. a video of a particular finger hitting a piano key). For example, fingering positions for guitar may be displayed as guitar tablature. FIG. 4a shows an example of how guitar chords will be represented to a learner to assist in identifying the correct notes to play in the chord listed in for example a song tutorial. For illustrative purposes, only a selected number of chords are shown. As exemplified in FIGS. 4a and 4c, guitar tablature is a graphical notation illustrating 6 vertical lines representing the 6 strings in a 6-string guitar and a number (typically 3 or more) of horizontal lines representing the frets on the fret-board of a guitar. A symbol in the form of, for example, a numbered circle on one of the vertical lines and in between, two adjacent frets may indicate a corresponding string position and a corresponding fret position for a finger to press on. FIG. 4b represents which fingers are used in the fingering positions shown in FIGS. 4a and 4c. FIG. 4c also represents a diagrammatic version of how the guitar chord (with fingering) will be presented on a virtual guitar. This is intended to assist those with limited previous knowledge identify where the fingering and notes are located on the actual guitar.

Apart from displaying or causing display of playing positions or fingering positions, the learning method at step 30 provides the user with one or more tempo-adjusted audio representations of a musical piece segment. This step may involve first providing an audio representation of the segment at a tempo that is considerably slower than the tempo at which the musical piece is written or intended to be played. The considerably slower tempo assists the user in reading the musical notes of the segment displayed at step 20, while practising on his/her own musical instrument and playing along with the tempo-adjusted audio representation. In other words, the tempo-adjusted audio representation of the segment may be backing music, with or without the lyrics, and its tempo is adjusted so as to suit initial learning of the segment at a slower pace.

In a preferred embodiment, the learning method may further provide the user with tempo-adjusted audio representations at a range of different tempos. Once the user is confident in correctly playing the segment at, for example, the slowest tempo, the user may practice or play along the backing music at a faster tempo. In this instance, the user may request the learning system to provide an audio representation of the segment at an increased tempo as desired. Alternatively, the learning system may automatically increase the tempo after providing backing music at a slower tempo for a predetermined number of times. Furthermore, the user may at any stage select a desired tempo to practice or play along. Ideally, the user is provided sequentially with audio representations of the segment at progressively faster tempos, up to the tempo at which the musical piece is written or intended to be played.

In the embodiment illustrated in FIG. 2, steps 20 and 30 may be repeated for each other segment of the musical piece. As illustrated in FIG. 3, the musical piece in this embodiment is divided into multiple segments (four in this example). Each of FIGS. 3A to 3D is a screenshot for a particular segment of the musical piece, intended to be displayed to the user with the respective backing music at various tempos provided to the user to practice or play along. In this embodiment, the user is expected to start from segment #1 and, after being able to play or perform segment #1 confidently or correctly, move on to segment #2 and so on until the user reaches segment #4. Once the user reaches the final segment, the user will be expected to play or perform the entire musical piece confidently or correctly.

After reaching the final segment, the user may be provided with the audio representation of the entire musical piece as backing music (again, with or without lyrics) to rehearse playing or performing the entire musical piece.

Figure 5:
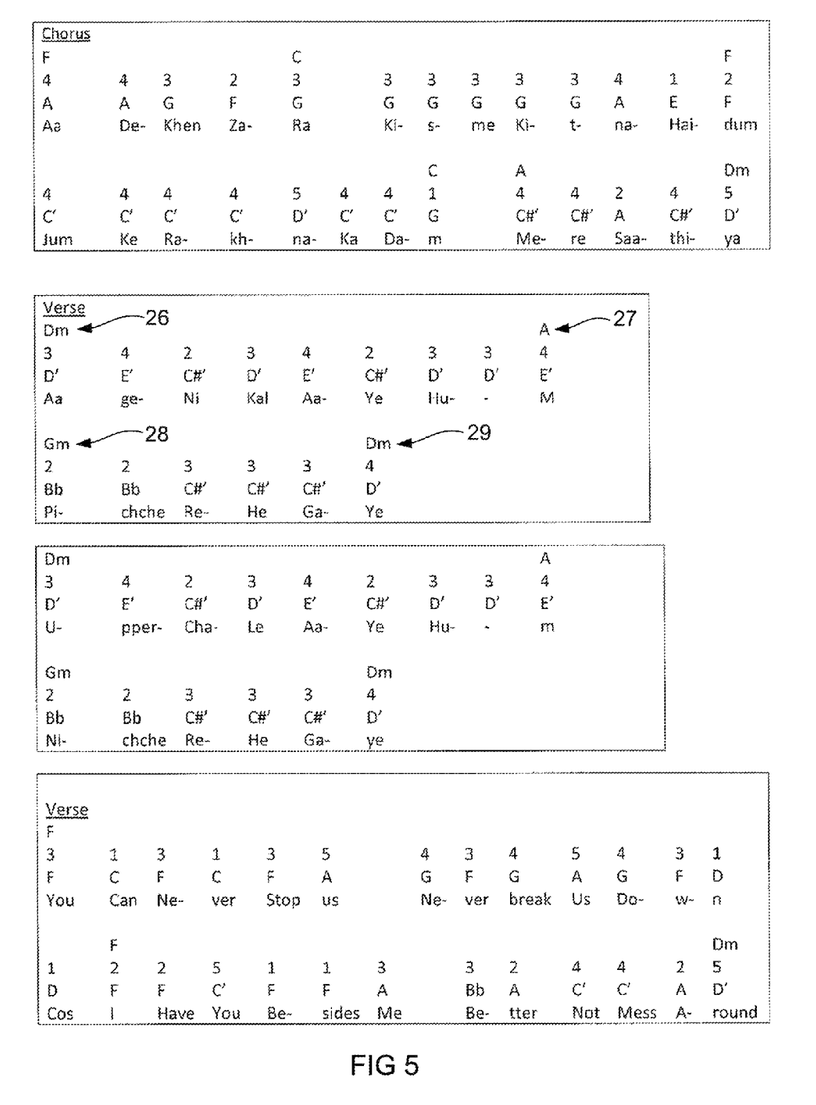
FIG. 5 illustrates screenshots of a display to the user of the learning method at step 30 according to another embodiment of the present invention.

As illustrated in FIG. 5, in another embodiment, each segment of the musical piece may be displayed with chords (such as 26, 27, 28 and 29) adjacent to the appropriate textual representation of musical notes and/or lyrics. In the example shown in FIG. 5, in the second segment of the musical piece, a D minor chord 26 is displayed above the first musical note D and corresponding lyrics "Aa". This display of the D minor chord 26 may indicate to the a piano player that he/she is to play a D minor chord with his/her left hand for the same duration as the corresponding melody comprising eight music notes D, E, C#, D, E, C#, D, D, to be played with respectively, the $3^{rd}$, $4^{th}$, $2^{nd}$, $3^{rd}$, $4^{th}$, $2^{nd}$, $3^{rd}$ and $3^{rd}$ fingers of his/her right hand. Similarly, an A major chord 27 is displayed above the ninth musical note E and corresponding lyrics "M". This display of the A major chord 27 may indicate to the piano player that he/she is to play an A major chord with his/her left hand for the same duration as the corresponding melody comprising one music note E to be played with the $4^{th}$ finger of his/her right hand.

As those skilled in the art will appreciate, the order of steps 20 and 30 may be reversed. Furthermore, steps 20 and 30 may be executed simultaneously or substantially simultaneously. By displaying a textual representation of musical notes to be played (eg. in step 20), the music learner may learn the correct pitch of each musical note in each segment. Similarly, by providing the tempo-adjusted audio representation(s) of each segment to the user (eg. in step 30), the user may learn the correct timing and duration of each musical note. Accordingly, the combination 25 of steps 20 and 30 repeated for each segment of the musical pieces enables the music learners to learn to play a musical piece without the need to understand the fundamentals of music theory or to know how to read music scores.

In a preferred embodiment, the learning method is provided via an Internet website hosted by a networked device such as a web server. The web server may be a computer system (or associated with a computer system) with an associated memory for storing digital contents. In this preferred embodiment, the learning method may allow the user to record or cause the learning system to record an audio or video representation of at least a part of the musical piece (hereinafter recording) performed by the user. The use may upload the recording to be received by, for example, a networked device. The uploaded recording may be stored by the networked device in the associated memory for later download or otherwise retrieval by the user. In some embodiments, availability for uploading the recording is limited to a first predetermined set of users, such as members of a community, including an online community. There may be a recommended format (eg. file type, file size, audio or video bit rate, audio or video codec) for uploading the recording for, for example, optimal streaming. In some embodiments, only audio or video of a predetermined format may be received by the networked device.

Furthermore, the stored recording may be downloaded by or streamed to, or otherwise shared to, other users of the music learning Internet website. In this instance, availability for downloading or streaming the stored recording may be limited to a second predetermined set of users of the music learning Internet website, such as those who have been pre-selected by the user uploading the recording as being allowed to download and stream the recording. Alternatively, the second predetermined set of users may be users who have a predetermined relationship with the user uploading the stored audio representation. For instance, only users who are friends or connected with the user uploading the stored audio representation on a social media website, such as Twitter® (a registered trademark of Twitter, Inc.) or Facebook® (a registered trademark of Facebook, Inc.), are permitted to download to stream the stored recording. In this instance, users with such permission may also provide comments or feedback (eg. "Likes" or "+1") on the recording on the social media website. Allowing comments to be made presents an opportunity for feedback to the uploading user on his/her performances for improvement and subsequent learning.

In a preferred embodiment, the audio representation of the musical piece is one played by the intended musical instrument. This further provides an added dimension of realism of the learning method to the user. Alternatively, the audio representation may be in a digitised form, such as the synthesised MIDI (Musical Instrument Digital Interface) format, of the musical instrument. The audio representation of the musical piece may be accompanied by a video representation of the musical piece.

Having described the various aspects and embodiments of the present invention, it should be apparent to a skilled person in the art that the present invention has the following advantages:

The present learning method and system enables the music learners to learn to play a musical piece without the need to read traditional music scores.

The present learning method and system also enables the music learners to learn independently without a music teacher.

Provision of the tempo-adjusted audio representation(s) allows the music learners to learn at an easy-to-manage pace.

Those skilled in the art will appreciate that the invention described herein is susceptible to variations and modifications other than those specifically described. For example, the musical piece may be divided into any number of segments other than four. The learning method and system of the present invention may be applicable to other musical instruments such as keyboard or guitar. All variations and modifications are to be considered within the ambit of the present invention the nature of which is to be determined from the foregoing description.

The claims defining the invention are as follows:

1. A method for facilitating learning of a musical piece to be played on a musical instrument, wherein the musical piece is divided into a plurality of musical piece segments, the method comprises the steps of:

a) for each one of the plurality of musical piece segments:
  i) causing display of a numeric representation of a fingering position adjacent to (1) a textual representation of a musical note of the respective musical piece segment and (2) lyrics of the respective musical piece segment, wherein the step of causing display of the numeric representation of the fingering position includes a step of causing display of any one of 1, 2, 3, 4 and 5 to represent a musical note to be played, respectively, by a thumb, an index finger, a middle finger, a ring finger and a little finger, and
  ii) providing a first tempo-adjusted audio representation of the respective musical piece segment at a first tempo, automatically increasing the first tempo to at least one second tempo and subsequently providing at least one second tempo-adjusted audio representation of the respective musical piece segment at the at least one second tempo;
b) for at least one of the plurality of musical piece segments, repeating steps i) and ii) a predetermined number of times, at different tempos, so as to provide two or more audio representations of the respective musical piece segment at different tempos, wherein the different tempos comprise at least the first tempo and the at least one second tempo;
c) sequentially performing steps i) and ii) for each of the musical piece segments to complete the musical piece.

2. The method according to claim 1, wherein the first tempo is slower than an original tempo at which the musical piece was written or intended to be played and the at least one second tempo, that is automatically increased, comprises progressively faster tempos.

3. The method according to claim 1 wherein the tempo-adjusted audio representations of the respective musical piece segment include backing music without the lyrics.

4. The method according to claim 1, wherein the step of causing display of the fingering position includes the step of causing display of a graphical or animated representation of the fingering position on the musical instrument.

5. The method according to claim 4 wherein the step of causing display of a graphical or animated representation of the fingering position on the musical instrument includes the step of causing display of guitar tablature.

6. The method according to claim 1 further comprising the step of recording or causing recording of an audio or video representation of at least a part of the musical piece performed by a user of the method.

7. The method according to claim 6 further comprising the step of receiving the recorded representation for any one of more of storage, downloading and streaming.

8. The method according to claim 7 wherein the step of receiving the recorded representation includes the step of receiving a predetermined format of the recorded representation.

9. The method according to claim 7 further comprising the step of receiving comments or feedback on the recorded representation.

10. The method according to claim 7 wherein the step of receiving the recorded representation includes the step of limiting availability for receiving the recorded representation to a first predetermined set of users.

11. The method according to claim 7 wherein the step of receiving the recorded representation for downloading or streaming includes the step of limiting availability for the downloading or the streaming to a second predetermined set of users.

12. The method according to claim 1 further comprising the step of providing an audio representation of the musical piece.

13. The method according to claim 12, wherein the step of providing an audio representation of a musical piece precedes the step of causing display of a playing position or the step of providing one or more tempo-adjusted audio representations.

14. The method according to claim 1 wherein the step of providing an audio representation of a musical piece includes the step of providing an audio representation of the musical piece played by the musical instrument.

15. The method according to claim 1 wherein the step of providing an audio representation of a musical piece includes the step of providing an audio representation of the musical piece played by a digitised or synthesised form of the musical instrument.

16. The method according to claim 1 wherein the textual representation of the musical note includes musical notations.

17. The method according to claim 16 wherein the musical notations include any one or more of A, B, C, D, E, F, G, $A^{\#}$, $B^{\#}$, $C^{\#}$, $D^{\#}$, $E^{\#}$, $F^{\#}$, $G^{\#}$, $A^{b}$, $B^{b}$, $C^{b}$, $D^{b}$, $E^{b}$, $F^{b}$ and $G^{b}$.

18. The method according to claim 16 wherein the musical notations include any one or more of do (or d), re (or r), mi (or m), fa (or f), so (or s), la (or l) and ti (or t).

19. The method according to claim 1 wherein the plurality of musical piece segments include four musical piece segments.

20. The method according to claim 1 wherein the tempo-adjusted audio representations of the respective musical piece segment include backing music without the lyrics.

21. A computer system for facilitating learning of a musical piece to be played on a musical instrument, the musical piece including a plurality of musical piece segments, the computer system comprising a processor being configured to execute the steps according to the method of claim 1.

22. A computer or processor non-transitory computer-readable medium for facilitating learning of a musical piece to be played on a musical instrument, the musical piece including a plurality of musical piece segments, the non-transitory computer-readable medium comprising instructions to cause a computer or processor to execute the steps according to the method of claim 1.

23. An apparatus for facilitating learning of a musical piece to be played on a musical instrument, the musical piece being dividable into a plurality of musical piece segments, the apparatus comprises:
an audio device for playing one or more tempo-adjusted audio representations of each of the plurality of the musical piece segments; and
display means for displaying, for each of the musical piece segments, a numeric representation of a fingering position adjacent to (i) a textual representation of a musical note of the respective musical piece segment and (ii) lyrics of the respective musical piece segment, wherein the numeric representation of the fingering position includes any one of 1, 2, 3, 4 and 5 to represent a musical note to be played, respectively, by a thumb, an index finger, a middle finger, a ring finger and a little finger, the apparatus configured wherein:
a) for at least one of the plurality of musical piece segments, the playing of the tempo-adjusted audio representations and the displaying of the playing position are repeated a predetermined number of times, at different tempos, so as to provide two or more audio representations of the respective musical piece segment at different tempos, wherein the different tempos comprise at least a first tempo and at least one second tempo that is automatically increased from the first tempo and, optionally, the at least one second tempo, that is automatically increased, comprises progressively faster tempos; and
b) said playing and said displaying are performed sequentially for the plurality of musical piece segments to complete the musical piece.

* * * * *